(12) United States Patent
Shaffer et al.

(10) Patent No.: US 7,402,636 B1
(45) Date of Patent: Jul. 22, 2008

(54) METHOD AND APPARATUS FOR DECREASING POLYMER DEPOSITION

(75) Inventors: Timothy D. Shaffer, Hackettstown, NJ (US); Michael F. McDonald, Kingwood, TX (US); David Y. Chung, Bellaire, TX (US); Robert N. Webb, Kingwood, TX (US); Deborah J. Davis, Pasadena, TX (US); Pamela J. Wright, Easton, PA (US)

(73) Assignee: ExxonMobil Chemical Patents Inc, Houston, TX (US)

( * ) Notice: Subject to any disclaimer, the term of this patent is extended or adjusted under 35 U.S.C. 154(b) by 0 days.

(21) Appl. No.: 11/728,324

(22) Filed: Mar. 23, 2007

(51) Int. Cl.
*C08F 2/12* (2006.01)
*C08F 4/52* (2006.01)

(52) U.S. Cl. .......................... 526/74; 526/64; 526/206; 526/210; 526/212; 526/920; 422/131

(58) Field of Classification Search ............... 526/74, 526/78, 64, 206, 210, 212; 422/131
See application file for complete search history.

(56) References Cited

U.S. PATENT DOCUMENTS

| | | | |
|---|---|---|---|
| 2,534,698 A | | 12/1950 | Calfee et al. |
| 2,548,415 A | | 4/1951 | Welch et al. |
| 2,553,426 A | * | 5/1951 | Schutze ............... 526/84 |
| 2,644,809 A | | 7/1953 | Saylor |
| 3,161,628 A | * | 12/1964 | Dost et al. ............ 526/138 |
| 3,177,184 A | * | 4/1965 | Cottle ................. 526/59 |
| 3,269,997 A | * | 8/1966 | Lyons et al. ........... 528/489 |
| 3,470,143 A | | 9/1969 | Schrage et al. |
| 3,660,160 A | | 5/1972 | Powers et al. |
| 3,808,187 A | | 4/1974 | Steigerwald et al. |
| 4,391,959 A | * | 7/1983 | Fauth et al. ............ 526/70 |
| 4,551,509 A | * | 11/1985 | Takayuki et al. ......... 526/68 |
| 5,028,674 A | * | 7/1991 | Hatch et al. ........... 526/216 |
| 5,191,044 A | | 3/1993 | Rath et al. |
| 5,417,930 A | | 5/1995 | McDonald, Jr. et al. |
| 5,527,870 A | | 6/1996 | Maeda et al. |
| 5,624,878 A | | 4/1997 | Devore et al. |
| 5,625,012 A | * | 4/1997 | Hussein et al. ........... 526/74 |
| 5,691,431 A | | 11/1997 | Chen et al. |
| 5,723,429 A | | 3/1998 | Mahler et al. |
| 5,744,662 A | | 4/1998 | Moallemi |
| 5,830,325 A | | 11/1998 | Mahler et al. |
| 6,156,161 A | | 12/2000 | Miller |
| 6,307,115 B1 | | 10/2001 | Guiraud et al. |
| 6,527,917 B1 | | 3/2003 | Kohno et al. |
| 2004/0015029 A1 | | 1/2004 | Lange et al. |
| 2005/0101751 A1 | | 5/2005 | Shaffer et al. |
| 2005/0107536 A1 | | 5/2005 | Shaffer et al. |
| 2006/0079655 A1 | | 4/2006 | Chung et al. |
| 2006/0084770 A1 | | 4/2006 | Milner et al. |
| 2006/0094847 A1 | | 5/2006 | Milner et al. |
| 2006/0100398 A1 | | 5/2006 | Shaffer et al. |
| 2006/0111522 A1 | | 5/2006 | McDonald et al. |

FOREIGN PATENT DOCUMENTS

| | | |
|---|---|---|
| CN | 1134710 | 10/1996 |
| CN | 1417234 | 5/2003 |
| EP | 1 003 699 | 5/2000 |
| JP | 57 016009 | 1/1982 |
| WO | WO 98/20046 A | 5/1998 |
| WO | WO 00/04061 | 1/2000 |
| WO | WO 02/34794 | 5/2002 |
| WO | WO 02/096964 | 12/2002 |
| WO | WO 2004/058827 | 7/2004 |
| WO | WO 2004/058828 | 7/2004 |
| WO | WO 2004/058829 | 7/2004 |
| WO | WO 2004/067577 | 8/2004 |
| WO | WO 2006/009550 | 1/2006 |
| WO | WO 2006/009553 | 1/2006 |
| WO | WO 2006/011868 | 2/2006 |

OTHER PUBLICATIONS

Morrison, R.T. et al, "*Macromolecules, Polymers and Polymerization*", Chapter 31, Organic Chemistry, 6th Edition, Prentice Hall Inc., Engelwood Cliffs, NJ, pp. 1084-1085, (1991).

Kennedy, Joseph P., "Olefin Polymerizations and Copolymerizations with Aluminum Alkyl-Cocatalyst Systems", Journal of Polymer Science, Polymer Chemistry Edition (1986), 6(11), pp. 3139-3150.

* cited by examiner

*Primary Examiner*—Fred M Teskin
(74) *Attorney, Agent, or Firm*—Nancy T. Krawczyk; Xiaobing Feng

(57) ABSTRACT

The disclosure provides a slurry polymerization system and method to decrease polymer deposition on reactor surfaces using an oxygenate such as alcohol (16) supplied to the polymerization medium (32) separate from the catalyst feed (34).

38 Claims, 2 Drawing Sheets

METHOD AND APPARATUS FOR DECREASING POLYMER DEPOSITION

FIELD OF INVENTION

The disclosure relates to a new slurry polymerization method and system using a feed additive to decrease polymer deposition on surfaces in contact with the reaction medium.

BACKGROUND

Isoolefin polymers are prepared in carbocationic polymerization processes. Of special importance is butyl rubber which is a copolymer of isobutylene with a small amount of isoprene. Butyl rubber is made by low temperature cationic polymerization that generally requires that the isobutylene have a purity of >99.5 wt % and the isoprene have a purity of >98.0 wt % to prepare high molecular weight butyl rubber.

The carbocationic polymerization of isobutylene and its copolymerization with comonomers like isoprene is mechanistically complex. See, e.g., Organic Chemistry, SIXTH EDITION, Morrison and Boyd, Prentice-Hall, 1084-1085, Englewood Cliffs, N.J. 1992, and K. Matyjaszewski, ed, Cationic Polymerizations, Marcel Dekker, Inc., New York, 1996. The catalyst is typically composed of two components: an initiator and a Lewis acid. Examples of Lewis acids include $AlCl_3$ and $BF_3$. Examples of initiators include Brønsted acids such as HCl, RCOOH (wherein R is an alkyl group), and $H_2O$. During the polymerization process, in what is generally referred to as the initiation step, isobutylene reacts with the Lewis acid/initiator pair to produce a carbenium ion. Following, additional monomer units add to the formed carbenium ion in what is generally called the propagation step. These steps typically take place in a diluent or solvent. Temperature, diluent polarity, and counterions affect the chemistry of propagation.

Industry has generally accepted widespread use of a slurry polymerization process (to produce butyl rubber, polyisobutylene, etc.) in the diluent methyl chloride. Typically, the polymerization process extensively uses methyl chloride at low temperatures, generally lower than –90° C., as the diluent for the reaction mixture. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of approximately 26% to 37% by volume in the reaction mixture can be achieved, as opposed to the concentration of only about 8% to 12% in solution polymerization. An acceptable relatively low viscosity of the polymerization mass is obtained enabling the heat of polymerization to be removed more effectively by surface heat exchange. Slurry polymerization processes in methyl chloride are used in the production of high molecular weight polyisobutylene and isobutylene-isoprene butyl rubber polymers, polymerization of isobutylene and para-methylstyrene, and are star-branched butyl rubber.

However, there are a number of problems associated with the polymerization in methyl chloride. For example, there can be a tendency of the polymer particles in the reactor to agglomerate with each other and to collect on the reactor wall, heat transfer surfaces, impeller(s), and the agitator(s)/pump(s). The rate of agglomeration increases rapidly as reaction temperature rises. Agglomerated particles tend to adhere to and grow and plate-out on all surfaces they contact, such as reactor discharge lines, as well as any heat transfer equipment being used to remove the exothermic heat of polymerization, which is critical since low temperature reaction conditions must be maintained.

Another problem associated with slurry polymerization is the tendency of the polymer to form or deposit on the reactor surfaces. This manner of polymer formation or deposition occurs when the polymer forms directly on the reactor surfaces, and is referred to herein as "film deposition" or "deposition" to distinguish from the agglomeration and collection of "sticky" polymer particles from the slurry, which is referred to herein as "polymer agglomeration," "particle agglomeration" or "agglomeration." The rate of polymer film deposition on the reactor surfaces is generally proportional to the rate of polymerization, whereas particle agglomeration depends more on the characteristics of the slurry, flow conditions, particle adhesion, etc.

The commercial reactors typically used to make these rubbers are well mixed vessels of greater than 10 to 30 liters in volume with a high circulation rate provided by a pump impeller. The polymerization and the pump both generate heat and, in order to keep the slurry cold, the reaction system needs to have the ability to remove the heat. An example of such a continuous flow stirred tank reactor ("CFSTR") is found in U.S. Pat. No. 5,417,930, incorporated by reference, hereinafter referred to in general as a "reactor" or "butyl reactor."

In butyl reactors, slurry is circulated through tubes of a heat exchanger by a pump, while boiling ethylene on the shell side provides cooling, the slurry temperature being determined by the boiling ethylene temperature, the required heat flux and the overall resistance to heat transfer. On the slurry side, the heat exchanger surfaces progressively accumulate polymer, either by agglomeration or deposition, inhibiting heat transfer, which would tend to cause the slurry temperature to rise. The resistance to heat transfer can be monitored by observing inlet and outlet temperature differences and the flow rate of the coolant, and taken as an indication of the extent of polymer accumulation. When the heat transfer resistance from polymer accumulation on the heat transfer surfaces becomes excessive, the reactor is taken out of service for cleaning. The subject of polymer accumulation has been addressed in several patents (such as U.S. Pat. No. 2,534,698, U.S. Pat. No. 2,548,415, U.S. Pat. No. 2,644,809). However, these patents have unsatisfactorily addressed the myriad of problems associated with film deposition on heat transfer surfaces for implementing a desired commercial process.

Chinese Patent Application No. 01134710.4, Public Disclosure No. CN 1417234A, discloses a method for the preparation of isoolefin polymers or copolymers by cationic polymerization in which a homopolymerization reaction of $C_4$-$C_7$ isoolefin monomers or a copolymerization reaction with other monomers is performed in a chlorohydrocarbon diluent using a Lewis acid as the primer, to which reaction system it is suggested to add such dispersing agents as carboxylic acid esters, ethers, ketones, amines, styrenes or alkyl substituted styrenes. The dispersing aids are said to lower the viscosity of the polymerization system and to make the dispersion of the insoluble polymer granules more uniform in the diluent. The reference claims that at a reaction temperature below –20° C., a stably dispersed polymer system can be obtained, the problem of heat transfer and mass transfer can be effectively improved, the dispersing agent that has been added can be easily obtained, and, at the same time, a narrower molecular weight distribution (MWD) of the polymer is obtained. However, there is no disclosure of any specific co-initiator for the Lewis acid, and some of the alleged dispersing aids are known comonomers.

Hydrofluorocarbons (HFC's) are chemicals that are currently used as environmentally friendly refrigerants because they have a very low (even zero) ozone depletion potential. Their low ozone depletion potential is thought to be related to the lack of chlorine. The HFC's also typically have low flammability particularly as compared to hydrocarbons and chlorinated hydrocarbons. HFC's have recently been disclosed as a polymerization system diluent. Some polymerization media, processes, reactors and systems that can employ HFC's are disclosed in the following commonly assigned patent references: WO2004058827; WO2004058828; WO2004058829; WO2004067577; WO2006011868; US2005101751; US2005107536; US2006079655; US2006084770; US2006094847; US2006100398; and US2006111522.

WO 02/34794 discloses a free radical polymerization process using hydrofluorocarbons. Other background references include DE 100 61 727 A, WO 02/096964, WO 00/04061, U.S. Pat. No. 5,624,878, U.S. Pat. No. 5,527,870, and U.S. Pat. No. 3,470,143.

Finding alternative blends of diluents, or a diluent additive to improve polymerization methods and systems that would reduce film deposition on reactor surfaces is desirable. Such improved methods and systems would reduce polymer deposition and reactor heat transfer resistance without compromising process parameters, conditions, or components and/or without sacrificing productivity/throughput and/or the ability to produce high molecular weight polymers.

SUMMARY OF THE INVENTION

This disclosure provides polymerization systems and processes using an alcohol via a feed separate from the catalyst feed to produce polymers with a reduced film formation rate on the reactor surfaces.

This disclosure relates in one aspect to a method to decrease polymer deposition on reactor surfaces in a slurry polymerization system. The method can include the step of supplying a monomer feed and a catalyst feed to form a polymerization medium in the reactor. According to an embodiment of the disclosure, film deposition can be inhibited by supplying an alcohol to the polymerization medium in a non-catalyst feed, e.g. a monomer feed.

In one embodiment, the alcohol can have from 1 to 4 carbon atoms. In another embodiment the alcohol is methanol. The alcohol can make up at least 2 or 5 parts per million (ppm) by weight (wppm) of the monomer feed before being polymerized.

In an embodiment alcohol can be added to the monomer stream in an amount effective to reduce film deposition, preferably up to 30 wppm by total weight of the monomer feed before being polymerized, from 2 to 20 wppm, or from 5 to 10 wppm. In another embodiment, the catalyst feed can be free of added alcohol.

In another embodiment, the method can include supplying to the polymerization medium in an amount up to 10 wppm by total weight of the polymerization medium one or more non-ionic oxygenate(s), or oxygenate(s) that is not a Brønsted acid, for example, oxygenate(s) selected from ethers, ketones and aldehydes having from 2 to 12 carbon atoms. In some embodiments, the one or more oxygenate(s) can be effective to further decrease polymer deposition. In other embodiments, the one or more nonionic oxygenate(s) comprises less than 5 wppm by total weight of the polymerization medium. The one or more oxygenate(s) can be supplied with the catalyst feed.

The catalyst can include one or more Lewis acid(s) and one or more initiator(s). In an embodiment, the one or more initiator(s) can be independently selected from the group consisting of water, a hydrogen halide, a carboxylic acid, a carboxylic acid halide, a sulfonic acid, an alcohol, a phenol, a polymeric halide, a tertiary alkyl halide, a tertiary aralkyl halide, a tertiary alkyl ester, a tertiary aralkyl ester, a tertiary alkyl ether, a tertiary aralkyl ether, an alkyl halide, an aryl halide, an alkylaryl halide or an arylalkylacid halide. In another embodiment, the catalyst can be free of alcohol. The catalyst can further include a weakly-coordinating anion.

In an embodiment, the monomer feed includes one or more monomer(s) and a diluent. The one or more monomer(s) can be independently selected from the group consisting of olefins, alpha-olefins, disubstituted olefins, isoolefins, conjugated dienes, non-conjugated dienes, styrenics, substituted styrenics, and vinyl ethers. In another embodiment, the one or more monomer(s) can be independently selected from the group consisting of styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, β-pinene, myrcene, 6,6-dimethylfulvene, hexadiene, cyclopentadiene, methyl cyclopentadiene, piperylene, methyl vinyl ether, ethyl vinyl ether, and isobutyl vinyl ether.

The diluent can be a halogenated hydrocarbon, e.g. chlorinated and/or fluorinated hydrocarbons. In one embodiment the diluent comprises methyl chloride. In another embodiment, the diluent comprises one or more hydrofluorocarbon(s) (HFC's). The HFC's can be represented by the formula: $C_xH_yF_z$ wherein x is an integer from 1 to 40 and y and z are integers of one or more. In other embodiments, x is from 1 to 10, from 1 to 6, or from 1 to 3. The one or HFC's can be, for example, independently selected from the group consisting of fluoromethane, difluoromethane, trifluoromethane, 1,1-difluoroethane, 1,1,1-trifluoroethane, 1,1,1,2-tetrafluoroethane, and mixtures thereof. The diluent can comprise from 25 to 100 volume % HFC based upon the total volume of the diluent. The HFC diluent can further include a halogenated hydrocarbon other than HFC, for example, methyl chloride. The diluent can also include a hydrocarbon, a non-reactive olefin and/or an inert gas. In another embodiment, the diluent can have a dielectric constant greater than 40 at −85° C.

The reactor can be independently selected from the group consisting of a continuous flow stirred tank reactor, a plug flow reactor, a moving belt or drum reactor, a jet or nozzle reactor, a tubular reactor, a batch reactor, and an autorefrigerated boiling-pool reactor.

In one embodiment, film can form in the reactor at a ratio of 10 mg film or less per g of polymer formed, and in other embodiments, 8, 6, 4, 3, or 2 mg film or less per g of polymer formed.

In a further embodiment, the method can include recovering a polymer slurry from the reactor, separating an alcohol-lean diluent from the polymer slurry, recycling the separated diluent to the monomer feed, and adding the alcohol to the monomer feed. In an embodiment, the diluent separation can include removal of oxygenates. In an embodiment, the diluent separation can include distillation, e.g. simple distillation or extractive distillation.

In an embodiment, the alcohol can be added to the monomer feed by determining alcohol content in at least one of the one or more feed(s) and controlling a rate of the alcohol addition to obtain a desired alcohol level. The desired level can be adjusted as necessary to decrease polymer deposition on the reactor surfaces.

Another aspect of the disclosure can provide a slurry polymerization system including a reactor comprising a polymerization medium comprising a halogenated hydrocarbon diluent, one or more monomer(s) and a catalyst comprising one or more Lewis acid(s) and one or more initiator(s). The polymerization system can have a line to supply catalyst to the reactor, a line to supply monomer to the reactor separately from the catalyst line, and a line to add alcohol to the reactor separately from the catalyst line. In an embodiment, the reactor can be a butyl reactor.

In an embodiment the slurry polymerization system can include means for determining a total alcohol supply rate to the reactor, e.g., a flowmeter or an analyzer, and means for adjusting a rate of alcohol addition via the alcohol addition line to obtain a total alcohol supply rate at a desired level, e.g., a flow controller or a valve. In an embodiment, the alcohol addition line can feed into the monomer supply line. The alcohol analyzer can include an on-line analyzer to sample the monomer supply line. In one embodiment, the system can have a diluent recovery loop to recover diluent from an effluent from the reactor, purify the diluent and recycle alcohol-lean diluent to the monomer supply line. The diluent purification can include distillation, e.g. simple or extractive distillation.

DRAWINGS

DETAILED DESCRIPTION

Figure 1:
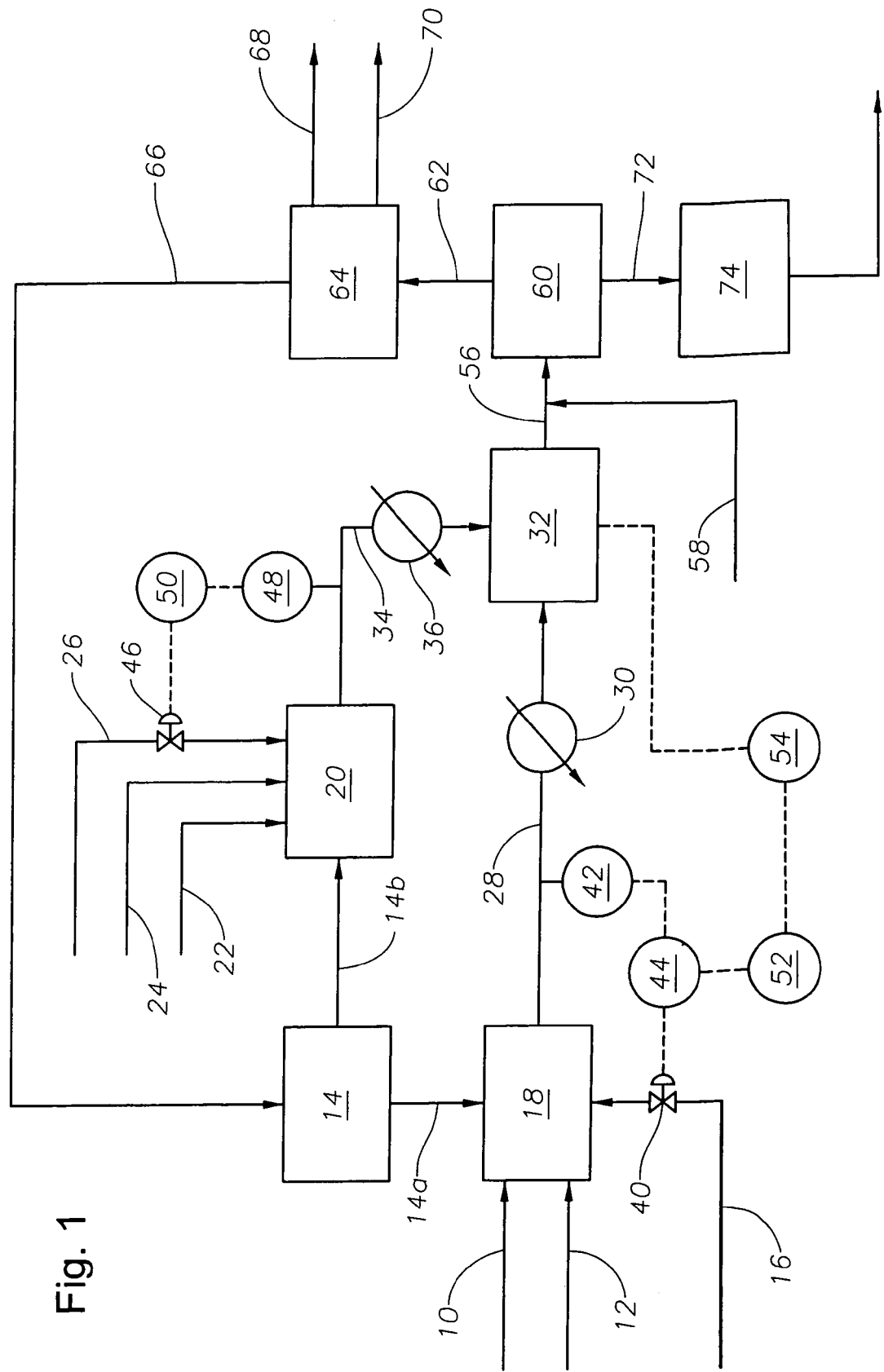
FIG. 1 is a schematic flow diagram of a polymerization system according to an embodiment of the disclosure.

For purposes of this disclosure and the claims thereto the term catalyst refers to and includes any Lewis acid(s) or other metal complex(es) used to catalyze the polymerization of the olefinic monomers of the disclosure, as well as at least one initiator, and optionally other minor catalyst component(s). The term catalyst feed refers to the feed(s) to the polymerization medium containing the Lewis acid(s) regardless of whether or not the initiator(s) and other catalyst components are added as separate streams or with the monomer feed. The term monomer feed refers to any stream fed to the reactor directly or indirectly that does not contain Lewis acid catalyst or a Lewis acid complex with an initiator. The term polymerization medium refers to an admixture of the catalyst, one or more polymerizable monomer(s) and diluent that can result from the mixture of separate monomer and catalyst feeds to the reactor.

In one embodiment, the disclosure provides a method to decrease polymer deposition on reactor surfaces in a slurry polymerization system comprising supplying an alcohol to the polymerization medium with a monomer feed.

The selection of polymerization conditions and components suitable to polymerize monomers to form a polymer are well within the ability of those skilled in the art necessary to obtain the production of a desired polymer in light of process parameters and component properties described herein. There are numerous permutations of the polymerization process and variations in the polymerization components available to produce the desired polymer attributes. In preferred embodiments, such polymers include polyisobutylene homopolymers, isobutylene-isoprene (butyl rubber) copolymers, isobutylene and para-methylstyrene copolymers, and star-branched butyl rubber terpolymers.

Diluent means a diluting or dissolving agent. Diluent is specifically defined to include chemicals that can act as solvents for the Lewis Acid, other metal complexes, initiators, monomers or other additives. In the practice of the disclosure, the diluent may not alter the general nature of the components of the polymerization medium, i.e., the components of the catalyst, monomers, etc. However, it is recognized that interactions between the diluent and reactants may occur. In preferred embodiments, the diluent does not react with the catalyst components, monomers, etc. to any appreciable extent. Additionally, the term diluent includes mixtures of at least two or more diluents.

A reactor is any container(s) in which a chemical reaction occurs. Reactor surfaces include the walls of the reactor vessel that contact or can come into contact with the polymerization medium or slurry, as well as the exposed surfaces of heat transfer surfaces, agitators and/or impeller(s), the outflow line or exit port, and the like where polymer accretions can form, deposit or film over.

Slurry refers to a volume of diluent comprising polymers that have precipitated from the diluent, monomers, Lewis acid, and initiator. The slurry concentration is the volume percent of the partially or completely precipitated polymers based on the total volume of the slurry.

As used herein, the new numbering scheme for the Periodic Table Groups are used as in CHEMICAL AND ENGINEERING NEWS, 63(5), 27 (1985).

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. Likewise, when catalyst components are described as comprising neutral stable forms of the components, it is well understood by one skilled in the art, that the ionic form of the component can be the form that reacts with the monomers to produce polymers.

Isoolefin refers to any olefin monomer having two substitutions on the same carbon. Multiolefin refers to any monomer having two double bonds. Elastomer or elastomeric composition, as used herein, refers to any polymer or composition of polymers consistent with the ASTM D1566 definition. The terms may be used interchangeably with the term "rubber(s)", as used herein.

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc. Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to replacement of at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

In one embodiment, this disclosure relates to the use of an alcohol in a monomer feed diluent such as a halogenated hydrocarbon, including chlorinated hydrocarbon(s), hydrofluorocarbon(s) or blends of hydrofluorocarbon(s) with hydrocarbon(s) and/or chlorinated hydrocarbon(s), to produce a polymer slurry which is less prone to the formation of polymer film on reactor surfaces. More particularly, this disclosure relates to the use of an alcohol additive in the monomer feed with chlorinated hydrocarbon diluent(s), hydrofluorocarbon (HFC) diluent(s) or HFC diluent blends with hydrocarbons and/or chlorinated hydrocarbon blends, to polymerize and copolymerize isoolefins with dienes and/or alkylstyrenes to produce isoolefin homopolymers and copolymers with significantly reduced reactor film formation. Further, this disclosure relates to the use of an alcohol additive in the monomer feed, to polymerize and copolymerize isoolefins with dienes to produce isoolefin copolymers with significantly reduced reactor film formation and hence longer run life for the reactors, as compared to conventional systems.

In another embodiment, the alcohol additive can be used in a monomer feed to a tubular reactor to obtain reduced polymer accumulation on the heat transfer tubes and/or reduce polymer accumulation on the impeller and thus obtain longer run life. In another embodiment, the alcohol additive can be used in a monomer feed to a tubular reactor at higher temperatures to produce polymers at much greater run lengths (such as greater than 15 hours, preferably greater than 20 hours, preferably greater than 30 hours, more preferably greater than 48 hours than possible with other polymerization systems.

In another embodiment the alcohol additive can be used in a monomer feed to an autorefrigerated boiling-pool reactor where heat is removed by evaporation of the diluent and monomers mixture to reduce film formation or deposition on the reactor wall and agitator/impeller surfaces, among other things.

In one embodiment, this disclosure relates to the discovery of new polymerization systems using monomer feed diluents containing an alcohol. These diluents can effectively dissolve the selected catalyst and monomers but are relatively poor solvents for the polymer product. Polymerization systems using these diluents are less prone to deposit polymer on the reactor surfaces than polymerization systems using no alcohol additive or an alcohol as a component solely in the catalyst feed.

Monomers and Polymers

Monomers which may be polymerized by this system include any hydrocarbon monomer that is polymerizable using this disclosure. Preferred monomers include one or more of olefins, alpha-olefins, disubstituted olefins, isoolefins, conjugated dienes, non-conjugated dienes, styrenics and/or substituted styrenics and vinyl ethers. The styrenic may be substituted (on the ring) with an alkyl, aryl, halide or alkoxide group. Preferably, the monomer contains 2 to 20 carbon atoms, more preferably 2 to 9, even more preferably 3 to 9 carbon atoms. Examples of preferred olefins include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, β-pinene, myrcene, 6,6-dimethyl-fulvene, hexadiene, cyclopentadiene, piperylene, methyl vinyl ether, ethyl vinyl ether, and isobutyl vinyl ether and the like. Monomer may also be combinations of two or more monomers. Styrenic block copolymers may also be used as monomers. Preferred block copolymers include copolymers of styrenics, such as styrene, para-methylstyrene, alpha-methylstyrene, and $C_4$ to $C_{30}$ diolefins, such as isoprene, butadiene, and the like. Particularly preferred monomer combinations include 1) isobutylene and para-methyl styrene 2) isobutylene and isoprene, as well as homopolymers of isobutylene.

Additionally, preferred monomers include those that are cationically polymerizable as described in *Cationic Polymerization of Olefins, A Critical Inventory*, Joseph Kennedy, Wiley Interscience, New York 1975. Monomers include any monomer that is cationically polymerizable, such as those monomers that are capable of stabilizing a cation or propagating center because the monomer contains an electron donating group.

The monomers may be present in the polymerization medium in an amount ranging from 75 wt % to 0.01 wt % in one embodiment, alternatively 60 wt % to 0.1 wt %, alternatively from 40 wt % to 0.2 wt %, alternatively 30 to 0.5 wt %, alternatively 20 wt % to 0.8 wt %, alternatively and from 15 wt % to 1 wt % in another embodiment.

Preferred polymers include homopolymers of any of the monomers mentioned herein. Examples of homopolymers include polyisobutylene, polypara-methylstyrene, polyisoprene, polystyrene, polyalpha-methylstyrene, polyvinyl ethers (such as polymethylvinylether, polyethylvinylether), and so on. Preferred polymers also include copolymers of 1) isobutylene and an alkylstyrene; and 2) isobutylene and isoprene.

In one embodiment butyl polymers are prepared by reacting a comonomer mixture, the mixture having at least (1) a $C_4$ to $C_6$ isoolefin monomer component such as isobutene with (2) a multiolefin, or conjugated diene monomer component. The isoolefin can range from 70 to 99.5 wt % by weight of the total comonomer mixture in one embodiment, from 85 to 99.5 wt % or from 92 to 99.5 wt % in other embodiments. The conjugated diene component is present in the comonomer mixture from 30 to 0.5 wt % in one embodiment, from 15 to 0.5 wt % or from 8 to 0.5 wt % in other embodiments. The $C_4$ to $C_6$ isoolefin may be one or more of isobutene, 2-methyl-1-butene, 3-methyl-1-butene, 2-methyl-2-butene, and 4-methyl-1-pentene. The multiolefin may be a $C_4$ to $C_{14}$ conjugated diene such as isoprene, butadiene, 2,3-dimethyl-1,3-butadiene, β-pinene, myrcene, 6,6-dimethyl-fulvene, hexadiene, cyclopentadiene and piperylene. One embodiment of the butyl rubber polymer of the disclosure is obtained by reacting 85 to 99.5 wt % of isobutylene with 15 to 0.5 wt % isoprene, or by reacting 95 to 99.5 wt % isobutylene with 5.0 wt % to 0.5 wt % isoprene in yet another embodiment.

This disclosure further relates to terpolymers and tetrapolymers comprising any combination of the monomers listed above. Preferred terpolymers and tetrapolymers include polymers comprising isobutylene, isoprene and divinylbenzene, polymers comprising isobutylene, para-alkylstyrene (preferably para-methylstyrene) and isoprene, polymers comprising cyclopentadiene, isobutylene, and paraalkyl styrene (preferably paramethyl styrene), polymers of isobutylene cyclopentadiene and isoprene, polymers comprising cyclopentadiene, isobutylene, and methyl cyclopentadiene, polymers comprising isobutylene, paramethylstyrene and cyclopentadiene.

Alcohols and Other Oxygenates

Alcohol useful in this disclosure is defined as a hydrocarbon having at least one hydroxide group per molecule. Alcohols useful in the monomer feed according to this disclosure include alcohols having from 1 to 12 carbon atoms, preferably from 1 to 8 carbon atoms, more preferably from 1 to 4 carbon atoms. Representative examples include methanol, ethanol, propanol, 2-propanol, 2-methylpropan-2-ol, cyclohexanol, and benzyl alcohol. Phenols useful in the monomer feed according to this disclosure include phenol; 2-methylphenol; 2,6-dimethylphenol; p-chlorophenol; p-fluorophenol; 2,3,4,5,6-pentafluorophenol; and 2-hydroxynaphthalene. Diols, glycols and polyols are also suitable alcohols. The alcohols can be substituted or unsubstituted.

The alcohol is preferably present in the monomer feed in an amount that is effective to reduce the rate of film formation on the reactor surfaces as compared to the monomer feed without the alcohol. In one embodiment, the alcohol is present in the monomer feed in an amount of at least 2 wppm by weight of the monomer feed before being polymerized, preferably at least 5 wppm. There does not appear to be any upper limit on the amount of alcohol employed in the monomer feed, but no further benefit in the reduction of film formation is obtained by the use of an amount above 30 wppm and larger amounts can adversely affect the diluent characteristics in some situations. Preferred ranges of alcohol are from 2 to 20 wppm or 5 to 10 wppm.

In one embodiment, the polymerization medium can be substantially free of other oxygenates, such as initiator oxygenates or Brønsted acid oxygenates other than alcohols that can alter the effectiveness of the alcohol to inhibit the polymer film from forming or depositing on the reactor surfaces, i.e. less than 5 wppm by weight of the monomer feed before being polymerized, preferably less than 1 wppm. In one embodiment the polymerization medium is also substantially free of nonionic oxygenates such as aldehydes, ethers and ketones. On the other hand, in some situations the presence of another nonionic oxygenate, preferably selected from aldehydes, ethers and/or ketones, especially ethers and ketones, from 1 or 2 wppm by weight of the monomer feed before being polymerized up to 5, 10 or 20 wppm, can facilitate the inhibition of the film formation. The presence of the ether and ketone oxygenates at higher concentrations, however, can have a detrimental effect resulting in an increased rate of polymer filming. Suitable ethers and ketones can have from 2 to 12 carbon atoms, preferably from 2 to 8 carbon atoms, more preferably from 2 to 4 carbon atoms. Representative examples include dimethyl ether, diethyl ether, diisopropyl ether, acetone, methyl ethyl ketone, and so on.

Diluents

Suitable diluents in the present disclosure include halogenated hydrocarbons, especially chlorinated and/or fluorinated hydrocarbons and the like. Specific examples include but are not limited to the halogenated versions of propane, isobutane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, and meta-xylene, preferably the chlorinated versions of the above, more preferably fluorinated versions of all of the above. Brominated versions of the above are also useful. Specific examples include, methyl chloride, methylene chloride, ethyl chloride, propyl chloride, butyl chloride, chloroform and the like.

Hydrofluorocarbons can be used as diluents in the present disclosure, alone or in combination with other hydrofluorocarbons or in combination with other diluents. For purposes of this disclosure and the claims thereto, hydrofluorocarbons ("HFC's" or "HFC") are defined to be saturated or unsaturated compounds consisting essentially of hydrogen, carbon and fluorine, provided that at least one carbon, at least one hydrogen and at least one fluorine are present.

In certain embodiments, the diluent comprises hydrofluorocarbons represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one.

In one embodiment, the diluent comprises non-perfluorinated compounds or the diluent is a non-perfluorinated diluent. Perfluorinated compounds consist of carbon and fluorine. However, in another embodiment, when the diluent comprises a blend, the blend may comprise perfluorinated compound, preferably, the catalyst, monomer, and diluent are present in a single phase or the aforementioned components are miscible with the diluent as described in further detail below. In another embodiment, the blend may also comprise those compounds consisting of chlorine, fluorine, and carbon.

In another embodiment, when higher weight average molecular weights (Mw) (typically greater than 10,000 Mw, preferably more than 50,000 Mw, more preferably more than 100,000 Mw) are desired, suitable diluents such as hydrofluorocarbons have a dielectric constant of greater than 10 at −85° C., preferably greater than 15, more preferably greater than 20, more preferably greater than 25, more preferably 40 or more. In embodiments where lower molecular weights (typically lower than 10,000 Mw, preferably less than 5,000 Mw, more preferably less than 3,000 Mw) are desired the dielectric constant may be less than 10, or by adding larger amounts of initiator or transfer agent when the dielectric constant is above 10. The dielectric constant of the diluent $\in_D$ is determined from measurements of the capacitance of a parallel-plate capacitor immersed in the diluent [measured value $C_D$], in a reference fluid of known dielectric constant $\in_R$ [measured value $C_R$], and in air ($\in_A$=1) [measured value $C_A$]. In each case the measured capacitance $C_M$ is given by $C_M = \in C_C + C_S$, where $\in$ is the dielectric constant of the fluid in which the capacitor is immersed, $C_C$ is the cell capacitance, and $C_S$ is the stray capacitance. From these measurements $\in_D$ is given by the formula $\in_D = ((C_D - C_A)\in_R + (C_R - C_D))/(C_R - C_A)$. Alternatively, a purpose-built instrument such as the Brookhaven Instrument Corporation BIC-870 may be used to measure dielectric constant of diluents directly. As examples, the dielectric constant ($\in$) at −85° C. is 18.34 for methyl chloride; 36.29 for difluoromethane; and 23.25 for 134a.

In other embodiments, one or more HFC's are used in combination with another diluent or mixtures of diluents. Suitable additional diluents include hydrocarbons, especially hexanes and heptanes, halogenated hydrocarbons, especially chlorinated hydrocarbons and the like. Specific examples include those mentioned above.

In another embodiment, non-reactive olefins may be used as diluents in combination with other diluents such as HFC's. Examples include, but are not limited to, ethylene, propylene, and the like.

In one embodiment, the HFC is used in combination with a chlorinated hydrocarbon such as methyl chloride. Additional embodiments include using the HFC in, combination with hexanes or methyl chloride and hexanes. In another embodiment the diluents such as HFC's are used in combination with one or more gases inert to the polymerization such as carbon dioxide, nitrogen, hydrogen, argon, neon, helium, krypton, xenon, and/or other inert gases that are preferably liquid at entry to the reactor. Preferred gases include carbon dioxide and/or nitrogen.

In another embodiment the diluents, including HFC's, are used in combination with one or more nitrated alkanes, including $C_1$ to $C_{40}$ nitrated linear, cyclic or branched alkanes. Preferred nitrated alkanes include, but are not limited to, nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above. A preferred embodiment is HFC's blended with nitromethane.

When employed in the diluent, the HFC is typically present at 1 to 100 volume percent based upon the total volume of the diluents, alternatively from a lower limit of 5, 10, 15, 20, 25, 30, 35, 40, 45, 50, 55, 60, 65, 70, 75, 80, 85, 90, 95, 97, 98, or 99 volume percent. In a preferred embodiment the HFC is blended with one or more chlorinated hydrocarbons. In another preferred embodiment the HFC is selected from the group consisting of difluoromethane, trifluoromethane, 1,1-difluoroethane, 1,1,1-trifluoroethane, and 1,1,1,2-tetrafluoroethane and mixtures thereof.

In another embodiment the diluent or diluent mixture is selected based upon its solubility in the polymer. Certain diluents are soluble in the polymer. Preferred diluents have little to no solubility in the polymer. Solubility in the polymer is measured by forming the polymer into a film of thickness between 50 and 100 microns, then soaking it in diluent (enough to cover the film) for 4 hours at −75° C. The film is removed from the diluent, exposed to room temperature for 90 seconds to evaporate excess diluent from the surface of the film, and weighed. The mass uptake is defined as the percentage increase in the film weight after soaking. In some embodiments, the he diluent or diluent mixture is chosen so that the polymer has a mass uptake of less than 4 wt %, preferably less than 3 wt %, preferably less than 2 wt %, preferably less than 1 wt %, more preferably less than 0.5 wt %.

In a preferred embodiment, the diluent or diluent mixture is selected such that the difference between the measured glass transition temperature Tg of the polymer with less than 0.1 wt % of any diluent, unreacted monomers and additives is within 15° C. of the Tg of the polymer measured after it has been formed into a film of thickness between 50 and 100 microns, that has been soaked in diluent (enough to cover the film) for 4 hours at −75° C. The glass transition temperature is determined by differential scanning calorimetry (DSC). Techniques are well described in the literature, for example, B. Wunderlich, "The Nature of the Glass Transition and its Determination by Thermal Analysis", in *Assignment of the Glass Transition*, ASTM STP 1249, R. J. Seyler, Ed., American Society for Testing and Materials, Philadelphia, 1994, pp. 17-31. The sample is prepared as described above, sealed immediately after soaking into a DSC sample pan, and maintained at a temperature below −80° C. until immediately before the DSC measurement. Preferably the Tg values of the diluent-free and diluent-soaked polymers are within 12° C. of each other, preferably within 11° C., 10° C., 9° C., 8° C., 7° C., 6° C., 5° C., 4° C., 3° C., 2° C., or 1° C. of each other.

Lewis Acid

In a preferred embodiment the Lewis acid (also referred to as the co-initiator or catalyst) may be any Lewis acid based on metals from Group 4, 5, 13, 14 and 15 of the Periodic Table of the Elements, including boron, aluminum, gallium, indium, titanium, zirconium, tin, vanadium, arsenic, antimony, and bismuth. One skilled in the art will recognize that some elements are better suited in the practice of the disclosure. In one embodiment, the metals are aluminum, boron and titanium, with aluminum being desirable. Illustrative examples include $AlCl_3$, (alkyl)$AlCl_2$, $(C_2H_5)_2AlCl$ and $(C_2H_5)_3Al_2Cl_3$, $BF_3$, $SnCl_4$, $TiCl_4$. In a particularly preferred embodiment, $BF_3$ is not the chosen Lewis acid.

Particularly preferred Lewis acids may be any of those useful in cationic polymerization of isobutylene copolymers including: aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, titanium tetrachloride, etc. with ethylaluminum dichloride and ethylaluminum sesquichloride being preferred.

Lewis acids such as methylaluminoxane (MAO) and specifically designed weakly coordinating Lewis acids such as $B(C_6F_5)_3$ are also suitable Lewis acids within the context of the disclosure.

Initiator

Initiators useful in this disclosure are those initiators which are capable of being complexed in a suitable diluent with the chosen Lewis acid to yield a complex which rapidly reacts with the olefin thereby forming a propagating polymer chain. Illustrative examples include Brønsted acids such as $H_2O$, HCl, RCOOH (wherein R is an alkyl group), alkyl halides, such as $(CH_3)_3CCl$, $C_6H_5C(CH_3)_2Cl$ and (2-Chloro-2,4,4-trimethylpentane). More recently, transition metal complexes, such as metallocenes and other such materials that can act as single site catalysts, such as when activated with weakly coordinating Lewis acids or Lewis acid salts have been used to initiate isobutylene polymerization.

In one embodiment, the reactor and the catalyst are substantially free of water. Substantially free of water is defined as less than 30 wppm (based upon total weight of the catalyst), preferably less than 20 wppm, preferably less than 10 wppm, preferably less than 5 wppm, preferably less than 1 wppm. However, when water is selected as an initiator, it is added to the catalyst to be present at greater than 30 wppm, preferably greater than 40 wppm, and even more preferably greater than 50 wppm (based upon total weight of the catalyst).

In a preferred embodiment the initiator comprises one or more of a hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, or arylalkylacid halide. In another embodiment, the initiator is not an oxygenate, and especially not an alcohol, present at more than 5 wppm by weight of the polymerization medium, and especially not present at more than 2 wppm.

Preferred hydrogen halide initiators include hydrogen chloride, hydrogen bromide and hydrogen iodide. A particularly preferred hydrogen halide is hydrogen chloride.

Preferred carboxylic acids included both aliphatic and aromatic carboxylic acids. Examples of carboxylic acids useful in this disclosure include acetic acid, propanoic acid, butanoic acid; cinnamic acid, benzoic acid, 1-chloroacetic acid, dichloroacetic acid, trichloroacetic acid, trifluoroacetic acid, p-chlorobenzoic acid, and p-fluorobenzoic acid. Particularly preferred carboxylic acids include trichloroacetic acid, trifluoroacteic acid, and p-fluorobenzoic acid.

Carboxylic acid halides useful in this disclosure are similar in structure to carboxylic acids with the substitution of a halide for the OH of the acid. The halide may be fluoride, chloride, bromide, or iodide, with the chloride being preferred. Preparation of acid halides from the parent carboxylic acids are known in the prior art and one skilled in the art should be familiar with these procedures. Carboxylic acid halides useful in this disclosure include acetyl chloride, acetyl bromide, cinnamyl chloride, benzoyl chloride, benzoyl bromide, trichloroacetyl chloride, trifluoroacetylchloride, trifluoroacetyl chloride and p-fluorobenzoylchloride. Particularly preferred acid halides include acetyl chloride, acetyl bromide, trichloroacetyl chloride, trifluoroacetyl chloride and p-fluorobenzoyl chloride.

Sulfonic acids useful as initiators in this disclosure include both aliphatic and aromatic sulfonic acids. Examples of preferred sulfonic acids include methanesulfonic acid, trifluoromethanesulfonic acid, trichloromethanesulfonic acid and p-toluenesulfonic acid.

Sulfonic acid halides useful in this disclosure are similar in structure to sulfonic acids with the substitution of a halide for the OH of the parent acid. The halide may be fluoride, chloride, bromide or iodide, with the chloride being preferred. Preparation of the sulfonic acid halides from the parent sulfonic acids are known in the prior art and one skilled in the art should be familiar with these procedures. Preferred sulfonic acid halides useful in this disclosure include methanesulfonyl chloride, methanesulfonyl bromide, trichloromethanesulfonyl chloride, trifluoromethanesulfonyl chloride and p-toluenesulfonyl chloride.

In one embodiment, alcohols are substantially absent from the catalyst, i.e. the catalyst feed has a molar ratio of alcohol to Lewis Acid less than 0.05. When used in the catalyst, alcohols useful in this disclosure include methanol, ethanol, propanol, 2-propanol, 2-methylpropan-2-ol, cyclohexanol, and benzyl alcohol. Phenols useful in the catalyst of this disclosure include phenol; 2-methylphenol; 2,6-dimethylphenol; p-chlorophenol; p-fluorophenol; 2,3,4,5,6-pentafluorophenol; and 2-hydroxynaphthalene.

Preferred tertiary alkyl and aralkyl initiators include tertiary compounds represented by the formula below:

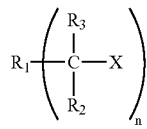

wherein X is a halogen, pseudohalogen, ether, or ester, or a mixture thereof, preferably a halogen, preferably chloride and $R_1$, $R_2$ and $R_3$ are independently any linear, cyclic or branched chain alkyls, aryls or arylalkyls, preferably containing 1 to 15 carbon atoms and more preferably 1 to 8 carbon atoms. n is the number of initiator sites and is a number greater than or equal to 1, preferably between 1 to 30, more preferably n is a number from 1 to 6. The arylalkyls may be substituted or unsubstituted. For the purposes of this disclosure and any claims thereto, arylalkyl is defined to mean a compound containing both aromatic and aliphatic structures. Preferred examples of initiators include 2-chloro-2,4,4-trimethylpentane; 2-bromo-2,4,4-trimethylpentane; 2-chloro-2-methylpropane; 2-bromo-2-methylpropane; 2-chloro-2,4,4,6,6-pentamethylheptane; 2-bromo-2,4,4,6,6-pentamethylheptane; 1-chloro-1-methylethylbenzene; 1-chloroadamantane; 1-chloroethylbenzene; 1,4-bis(1-chloro-1-methylethyl) benzene; 5-tert-butyl-1,3-bis(1-chloro-1-methylethyl)benzene; 2-acetoxy-2,4,4-trimethylpentane; 2-benzoyloxy-2,4,4-trimethylpentane; 2-acetoxy-2-methylpropane; 2-benzoyloxy-2-methylpropane; 2-acetoxy-2,4,4,6,6-pentamethylheptane; 2-benzoyl-2,4,4,6,6-pentamethylheptane; 1-acetoxy-1-methylethylbenzene; 1-aceotxyadamantane; 1-benzoyloxyethylbenzene; 1,4-bis(1-acetoxy-1-methylethyl)benzene; 5-tert-butyl-1,3-bis(1-acetoxy-1-methylethyl)benzene; 2-methoxy-2,4,4-trimethylpentane; 2-isopropoxy-2,4,4-trimethylpentane; 2-methoxy-2-methylpropane; 2-benzyloxy-2-methylpropane; 2-methoxy-2,4,4,6,6-pentamethylheptane; 2-isopropoxy-2,4,4,6,6-pentamethylheptane; 1-methoxy-1-methylethylbenzene; 1-methoxyadamantane; 1-methoxyethylbenzene; 1,4-bis(1-methoxy-1-methylethyl) benzene; 5-tert-butyl-1,3-bis(1-methoxy-1-methylethyl) benzene and 1,3,5-tris(1-chloro-1-methylethyl)benzene. Other suitable initiators can be found in U.S. Pat. No. 4,946,899, which is herein incorporated by reference. For the purposes of this disclosure and the claims thereto pseudohalogen is defined to be any compound that is an azide, an isocyanate, a thiocyanate, an isothiocyanate or a cyanide.

Another preferred initiator is a polymeric halide, one of $R_1$, $R_2$ or $R_3$ is an olefin polymer and the remaining R groups are defined as above. Preferred olefin polymers include polyisobutylene, polypropylene, and polyvinylchloride. The polymeric initiator may have halogenated tertiary carbon positioned at the chain end or along or within the backbone of the polymer. When the olefin polymer has multiple halogen atoms at tertiary carbons, either pendant to or within the polymer backbone, the product may contain polymers which have a comb like structure and/or side chain branching depending on the number and placement of the halogen atoms in the olefin polymer. Likewise, the use of a chain end tertiary polymer halide initiator provides a method for producing a product which may contain block copolymers.

Particularly preferred initiators may be any of those useful in cationic polymerization of isobutylene copolymers including: hydrogen chloride, 2-chloro-2,4,4-trimethylpentane, 2-chloro-2-methylpropane, 1-chloro-1-methylethylbenzene, and methanol.

Catalyst compositions useful in this disclosure typically comprise (1) an initiator and (2) a Lewis acid coinitiator. In a preferred embodiment, the Lewis acid coinitiator is present anywhere from about 0.1 moles times the moles of initiator present to about 200 times the moles of initiator present. In a further preferred embodiment, the Lewis acid coinitiator is present at anywhere from about 0.8 times the moles of initiator present to about 20 times the moles of initiator present. In a preferred embodiment the initiator is present at anywhere from about 0.1 moles per liter to about $10^{-6}$ moles per liter. It is of course understood that greater or lesser amounts of initiator are still within the scope of this disclosure.

The amount of the catalyst employed will depend on desired molecular weight and molecular weight distribution of the polymer being produced. Typically the range will be from about $1 \times 10^{-6}$ moles per liter to $3 \times 10^{-2}$ moles per liter and most preferably from $10^{-4}$ to $10^{-3}$ moles per liter.

Catalysts useful in this disclosure may further comprise a catalyst composition comprising of a reactive cation and a weakly-coordinating anion ("WC anion" or "WCA" or "NCA"). The catalyst composition comprising the WC anion will include a reactive cation and in certain instances are novel catalysts.

A weakly-coordinating anion is defined as an anion which either does not coordinate to the cation or which is weakly coordinated to the cation and when the anion is functioning as the stabilizing anion in this disclosure the WCA does not transfer an anionic fragment or substituent to the cation thus creating a neutral by-product or other neutral compound. Preferred examples of such weakly-coordinating anions include: alkyltris(pentafluorophenyl) boron ($RB(pfp)_3^-$), tetraperfluorophenylboron ($B(pfp)_4^-$), tetraperfluorophenylaluminum carboranes, halogenated carboranes and the like. The cation is any cation that can add to an olefin to create a carbocation.

The anion may be combined with the cation by any method known to those of ordinary skill in the art. For example in a preferred embodiment the WC anion is introduced into the diluent as a compound containing both the anion and the cation in the form of the active catalyst. In another preferred embodiment a composition containing the WC anion fragment is first treated to produce the anion in the presence of the cation or reactive cation source, i.e. the anion is activated. Likewise the WC anion may be activated without the presence of the cation or cation source which is subsequently introduced. In a preferred embodiment a composition containing the anion and a composition containing the cation are combined and allowed to react to form a by-product, the anion and the cation.

Polymerization System and Process

The present disclosure can provide a polymerization system to polymerize one or more monomer(s) to form isoolefin polymers and copolymers without an excessive film deposition rate on reactor surfaces. The system can include: a reaction zone to polymerize the one or more monomer(s) in a polymerization medium comprising the one or more monomer(s), a diluent and a catalyst; a monomer feed line to supply the one or more monomer(s) and diluent to the polymerization medium in the reaction zone; an alcohol supply line; a catalyst feed line separate from the alcohol supply line to supply one or more Lewis acid(s) to the polymerization medium in the reaction zone; and a control loop to adjust a feed rate of the alcohol in the alcohol supply line to the reaction zone. The diluent can be one or more halogenated hydrocarbon(s).

In an embodiment, the system can also include a product line to recover a mixture of polymer and diluent from the reaction zone, a polymer recovery unit to separate diluent from the mixture and recover the polymer, a diluent recovery unit to enrich the separated diluent, and a transfer line to recycle the enriched diluent to the monomer feed line. The alcohol supply line can introduce the alcohol to the reaction zone, e.g. directly, via the monomer feed line, or a combination thereof.

In an embodiment, the diluent enrichment unit can include a fractionation operation, which can be an extractive distillation unit, to produce alcohol-lean diluent for recycle. In another embodiment, the diluent enrichment unit can include means for alcohol removal.

In another embodiment, the control loop can include an alcohol analyzer to determine alcohol level in the monomer feed line, and a flow proportionality controller in communication with the alcohol analyzer and operatively associated with the alcohol supply line, e.g. to control a flow rate of the alcohol supply line to achieve desired alcohol level at the alcohol analyzer. In an embodiment, the control loop can include a film deposition rate analysis unit to determine the rate of film deposition in the reactor, in communication with a flow proportionality controller to control a flow rate of the alcohol supply line. In embodiments, the alcohol supply line can be connected to the monomer feed line, which can be connected to a reactor housing the reaction zone.

In embodiments of the foregoing polymerization system, the reactor can be independently selected from the group consisting of a continuous flow stirred tank reactor, a plug flow reactor, a moving belt or drum reactor, a jet or nozzle reactor, a tubular reactor, a batch reactor, and an autorefrigerated boiling-pool reactor. The reactor can be operated on a continuous or semicontinuous basis.

FIG. 1 is a schematic flow diagram of a polymerization system or process according to a non-limiting embodiment of the disclosure. Isobutylene in line 10, comonomer(s) in line 12, diluent 14a from storage 14 and alcohol, optionally with other oxygenate, in line 16 are blended in feed blend unit 18. Feed blend unit 18 is conventional except in respect of the alcohol and/or oxygenate addition. As is known in the art, it is typical to dry and fractionate the isobutylene and/or comonomer(s) if necessary to remove impurities in advance of the feed blend unit 18. The catalyst preparation unit 20 generally includes conventional apparatus for mixing the initiator 22 and Lewis acid 24, and diluting the catalyst complex with the desired amount of diluent 14b from diluent storage 14. If desired, oxygenate may optionally be introduced into the catalyst preparation unit 20 via line 26.

Monomer is fed from feed blend unit 18 via line 28, optionally through chiller 30, and then to polymerization reactor 32. Catalyst complex is similarly fed from catalyst preparation unit 20 via line 34, optionally through chiller 36, to the reactor 32. The disclosure may be practiced in continuous and batch processes. Further the reactor 32 can be a plug flow reactor and/or stirred tank reactors. Chillers 30 and 36 are optional and can be used upstream or downstream from the feed blend unit 18 and/or catalyst preparation unit 20.

Oxygenate feed to the reactor 32 can include alcohol via monomer feed blending unit 18, and other oxygenate optionally via catalyst preparation unit 20, or a combination thereof. Further, the oxygenate level or rate can be monitored in any one or more of the feed lines to or from the feed blend unit 18 or the catalyst preparation unit 20, for example, any one or more of lines 10, 12, 14a, 14b, 22, 24, 28 and 34, or via a separate line (not shown) to the reactor 32. In one illustrated embodiment in FIG. 1, the alcohol oxygenate is added via line 16 to the feed blending unit 18. The line 16 can include a flow control valve 40, and the associated flow control loop can include oxygenate flow or rate transmitter 42 and flow controller 44. In another illustrated embodiment in FIG. 1, another oxygenate is additionally added via line 26 to the catalyst preparation unit 20. The line 26 can include a flow control valve 46, and the associated flow control loop can include a oxygenate flow or rate transmitter 48 and flow controller 50. Flow control loops are well known in the art. The oxygenate rate transmitter can include an online analyzer such as a gas chromatograph (GC) and a flow meter.

The flow control loops can be operated to adjust the flow rate of alcohol-containing oxygenate 16 and optionally other oxygenate 26 to match a respective desired level for the rate transmitter 42, 48, e.g. if the oxygenate rate is below the desired level, the corresponding control valve 40, 46 is opened to increase the oxygenate flow rate. The oxygenate flow rate desired level(s) can be entered manually or automatically as part of a film deposition rate controller 52, which can be independent or part of a distributed or centralized process control system. The oxygenate flow rate desired level can be determined and adjusted based on the rate of film deposition detected or determined from deposition rate analysis unit 54 associated with the operation of the reactor 32. For example, the oxygenate feed rate can be decreased from a default maximum setting until the observed deposition rate analysis unit 54 indicates an increased film deposition rate in the reactor 32, or increased from a steady state setting if the analysis unit 54 indicates a rise in the deposition rate. The film deposition rate analysis unit 54 is known in the art, and the film deposition rate in the reactor 32 can be determined, for example, from the rate of increase of heat transfer resistance, which in turn can be calculated based on a heat balance of the reactor 32 and flux rates. In general, the thickness of the film deposited on the heat transfer surfaces of reactor 32 is proportional to the overall heat transfer resistance, and thus the rate of increase of the heat transfer resistance is proportional to the rate of film deposition.

The polymer-containing effluent 56 from the reactor 32 can if desired be quenched by a quench medium such as steam and/or hot water introduced via line 58. The polymer is then separated from the slurry in polymer recovery unit 60, using the heat from the quench medium to vaporize diluent and unreacted monomers in a flash tank or stripper, for example. The vapor stream 62 is then dried and fractionated in diluent recovery unit 64 to obtain diluent recycle 66, recovered monomer 68, which may also be recycled, and one or more oxygenate or waste stream(s) 70. It is also possible for all or part of the oxygenate to be produced with the diluent recycle 66 and recovered monomer 68, provided there is a purge or bleed mechanism to prevent excessive levels from accumulating in the process. For example, some or all of the oxygenate can be extracted with the quench medium and/or polymer. In one embodiment, the polymer recovery unit 60 is operated to control a partition of the oxygenate between the vapor stream 62 and liquid quench medium by maintaining the appropriate pressure and temperature conditions. The recovered polymer is transferred via line 72 for finishing operation 74 which can remove residual diluent, monomers, and quench medium using a series of screens and extruders, followed by compression into bales, wrapping and packaging in containers as desired. Apparatus and methods for polymer recovery 60, diluent recovery 64 and polymer finishing 74 are well known in the art.

In another aspect, heat can be removed from the reactor 32 by use of heat transfer surfaces, such as in a tubular reactor where a coolant is on one side of the tube and the polymerizing mixture is on the other side. Heat may also be removed by evaporating the polymerizing mixture, such as may be found in an autorefrigerated boiling pool type reactor. Another example is a plug flow reactor where a portion of the polymerizing mixture is evaporated as the mixture proceeds through the reactor. Another example is where heat is removed in a plug flow reactor through surface heat transfer using coolant on the other side of a heat transfer surface. Another example would be a reactor where polymerization takes place on a moving belt or drum where the diluent/monomer/catalyst mixture is sprayed onto the belt or drum and heat is removed by evaporation of the diluent as the reaction proceeds. In addition heat may be removed in such reactors by surface heat transfer (such as where the coolant is present on the inside of the drum or under the belt and the polymer is produced on the other side of the belt or drum). Another type of reactor 32 is a jet or nozzle reactor. These reactors have a short residence time where the monomer feed in line 28 and catalyst complex in line 34 are combined in the jet or nozzle and the polymerization occurs as the mixture passes through the nozzle at high velocity.

Preferred reactor 32 includes a continuous flow stirred tank reactor, whether operating in batch or continuous mode, and whether operating in a tank with an agitator or in a tube type reactor. Preferred reactor 32 also includes a reactor where the polymerization occurs on one side of a heat transfer surface and the coolant is present on the other side. An example is a reactor where tubes containing coolant run inside the reactor polymerization zone. Another example would be where the polymerization occurs inside a tube and the coolant is present on the outside of the tube in a shell.

This disclosure may also be practiced in batch reactors where the monomers, diluent, catalyst and oxygenate are charged to the reactor 32 and then polymerization proceeds to completion (such as by quenching) and the polymer is then recovered.

The reacted monomers within the reactor 32 form part of a slurry. In one embodiment, the concentration of the solids in the slurry is equal to or greater than 10 vol %, and in other embodiments equal to or greater than 25 vol %, less than or equal to 75 vol %, or in a range from 1 to 70 vol %, 5 to 70 vol %, 10 to 70 vol %, 15 to 70 vol %, 20 to 70 vol %, 25 to 70 vol %, 30 to 70 vol %, or 40 to 70 vol %.

Typically, a continuous flow stirred tank-type reactor 32 may be used. The reactor 32 is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes at the termini of lines 28 and 34) for monomers, diluents, catalysts and oxygenate (combined or separately), temperature sensing means, and an effluent overflow or outflow pipe which withdraws polymer, diluent and unreacted monomers among other things, to a holding drum or quench tank (not shown). Preferably, the reactor 32 is purged of air and moisture. One skilled in the art will recognize proper assembly and operation.

The reactor 32 is preferably designed to deliver good mixing of the catalyst and monomers within the reactor, good turbulence across or within the heat transfer tubes or coils, and enough fluid flow throughout the reaction volume to avoid excessive polymer accumulation or separation from the diluent. Other reactors that may be utilized in the practice of the present disclosure include any conventional reactors and equivalents thereof capable of performing a continuous slurry process, such as disclosed in U.S. Pat. No. 5,417,930, herein incorporated by reference. The reactor pump impeller can be of the up-pumping variety or the down-pumping variety. The reactor 32 can contain sufficient amounts of the catalyst effective to catalyze the polymerization of the monomer containing feed-stream such that a sufficient amount of polymer having desired characteristics is produced. The feed 28 in one embodiment contains a total monomer concentration greater than 5 wt % (based on the total weight of the monomers, diluent, oxygenate and catalyst), preferably greater than 15 wt %, 20 wt %, 25 wt %, or greater than 30 wt %. In another embodiment, the feed 28 can contain from 5 wt % to 50 wt % or from 30 wt % to 50 wt % monomer concentration based on the total weight of monomer, diluent, oxygenate and catalyst.

The reaction conditions can be such that desirable temperature, pressure and residence time are effective to maintain the reaction medium in the liquid state and to produce the desired polymers having the desired characteristics. The monomer feed-stream 28 is typically substantially free of any impurity which is adversely reactive with the catalyst under the polymerization conditions. For example, in some embodiments, the monomer feed 28 preferably can be substantially free of bases (such as caustic), and if they are not used as controlled oxygenates, sulfur-containing compounds (such as $H_2S$, COS, and organo-mercaptans, e.g., methyl mercaptan, ethyl mercaptan), nitrogen-containing bases, other oxygenates containing bases such as alcohols and the like. However monomer feed 28 may be less pure, typically not less than 95% based on total olefinic content by weight of the monomers supplied via lines 10 and 12, more preferably not less than 98%, not less than 99%. In preferred embodiments the impurities are present at less than 10,000 wppm (by weight), preferably less that 500 wppm, preferably less than 250 wppm, preferably less than 150 wppm, preferably less than 100 wppm, by weight of the monomers supplied via lines 10 and 12.

As is normally the case, reaction time, temperature, concentration, the nature of the reactants, and similar factors determine product molecular weights and molecular weight distribution (MWD). The polymerization reaction temperature is conveniently selected based on the target polymer molecular weight and the monomer to be polymerized as well as standard process variable and economic considerations, e.g., rate, temperature control, etc. The temperature for the polymerization is less than 0° C., preferably between –10° C. and the freezing point of the slurry in one embodiment, and from –25° C. to –120° C. in another embodiment. In yet another embodiment, the polymerization temperature is from –40° C. to –100° C., and from –70° C. to –100° C. in yet another embodiment. In yet another desirable embodiment, the temperature range is from –80° C. to –100° C.

In a preferred embodiment, the polymerization temperature is within 10° C. above the freezing point of the diluent, preferably within 8° C., 6° C., 4° C., 2° C., or 1° C. above the freezing point of the diluent.

The reaction pressure can be from above 0 to 14,000 kPa in one embodiment (where 0 kPa is a total vacuum), or from 7 kPa to 12,000 kPa, from 100 kPa to 2000 kPa, from 200 kPa to 1500 kPa, from 200 kPa to 1200 kPa, from 200 kPa to 1000 kPa, from 7 kPa to 100 kPa, from 20 kPa to 70 kPa, from 40 kPa to 60 kPa, from 1000 kPa to 14,000 kPa, from 3000 kPa to 10,000 kPa, or from 3,000 kPa to 6,000 kPa in other embodiments.

In another embodiment, the initiator 22 and Lewis acid 24 are pre-complexed by mixing together with any oxygenate via line 26 in the selected diluent in any order for a prescribed amount of time ranging from 0.01 second to 10 hours, and then is injected into the continuous reactor 32 through a catalyst nozzle or injection apparatus. In yet another embodiment (not shown), Lewis acid 24 and the initiator 22 are added to the reactor 32 separately, with or without oxygenate via line 26 supplied with one or both thereof. In another embodiment (not shown), the initiator 22 is blended with the feed monomers in feed blend unit 18 before injection to the reactor 32. Desirably, the monomer is not contacted with either the Lewis acid 24, or Lewis acid 24 combined with initiator 22, before the monomers enter the reactor.

In an embodiment of the disclosure, the initiator 22 and Lewis acid 24, with or without oxygenate 26, are allowed to pre-complex by mixing together in the selected diluent at temperatures between −40° C. and the freezing point temperature of the diluent, with a contact time between 0.01 seconds and several hours, and between 0.1 seconds and 5 minutes, preferably less than 3 minutes, preferably between 0.2 seconds and 1 minute before injection into the reactor. In another embodiment of the disclosure, the initiator 22 and Lewis acid 24, with or without oxygenate 26, preferably with oxygenate 26, are allowed to pre-complex by mixing together in the selected diluent at temperatures between +80 and −150° C., typically between −40° C. and −98° C.

The overall residence time in the reactor 32 can vary, depending upon, e.g., catalyst activity and concentration, monomer concentration, feed injection rate, production rate, reaction temperature, and desired molecular weight, and generally will be between about a few seconds and five hours, and typically between about 10 and 60 minutes. Variables influencing residence time include the monomer and diluent feed injection rates and the overall reactor volume.

The catalyst (Lewis acid) to monomer ratio utilized will be those conventional in this art for carbocationic polymerization processes, such as, for example, a molar monomer to catalyst ratio from 500 to 10000, or in the range of 2000 to 6500. In yet another desirable embodiment, the molar ratio of Lewis acid to initiator is from 0.5 to 10, or from 0.75 to 8. The overall concentration of the initiator in the reactor is typically from 5 to 300 wppm or 10 to 250 wppm. The concentration of the initiator in the catalyst feed is typically from 50 to 3000 wppm in one embodiment. Another way to describe the amount of initiator in the reactor is by its amount relative to the polymer, such as, for example, from 0.25 to 20 moles polymer/mole initiator, or from 0.5 to 12 mole polymer/mole initiator.

Catalyst efficiency (based on Lewis acid) in the reactor is maintained between 10,000 and 300 kg of polymer per kg of catalyst, and desirably in the range of 4000 to 1000 kg of polymer per kg of catalyst by controlling the molar ratio of Lewis acid to initiator.

In one embodiment, the polymerization of cationically polymerizable monomers (such as polymerization of isobutylene and isoprene to form butyl rubber) comprises several steps. First, a reactor having a pump impeller capable of up-pumping or down-pumping is provided. The pump impeller is typically driven by an electric motor with a measurable amperage. The reactor typically is equipped with parallel vertical reaction tubes within a jacket containing liquid ethylene. The total internal volume, including the tubes, is greater than 30 to 50 liters, thus capable of large scale volume polymerization reactions. The reactor typically uses liquid ethylene to draw the heat of the polymerization reaction away from the forming slurry. The pump impeller keeps a constant flow of slurry, diluent, catalyst and unreacted monomers through the reaction tubes. A feed of the cationically polymerizable monomer(s) (such as isoprene and isobutylene) in a polar diluent with the added alcohol is charged into the reactor. The catalyst is then charged into the reactor, the catalyst having a Lewis acid and an initiator present in a molar ratio of from 0.50 to 10.0. Within the reactor, the feed of monomers and catalyst are allowed to contact one another, the reaction thus forming a slurry of polymer (such as butyl rubber), wherein the solids in the slurry have a concentration of from 20 vol % to 50 vol %. Finally, the thus formed polymer is allowed to exit the reactor through an outlet or outflow line while simultaneously allowing the feed charging to continue, thus constituting the continuous slurry polymerization. Advantageously, the present disclosure improves this process in a number of ways, e.g., by reducing the rate of polymer film deposition on the reactor walls, heat transfer surfaces, agitators and/or impeller(s), and in the outflow line or exit port, and ultimately reducing the amount of polymer accumulation in the reactor as measured by heat transfer resistance increases so as to allow longer runs without shutting down the reactor for cleaning or other maintenance.

In one embodiment, the resultant polymer from one embodiment of the disclosure is a polyisobutylene/isoprene polymer (butyl rubber) that has a molecular weight distribution of from about 2 to 5, and an unsaturation of from 0.5 to 2.5 moles per 100 mole of monomer. This product may be subjected to subsequent halogenation to afford a halogenated butyl rubber.

INDUSTRIAL APPLICATIONS

The polymers of the disclosure provide chemical and physical characteristics that make them highly useful in wide variety of applications. The low degree of permeability to gases accounts for the largest uses of these polymers, namely inner tubes and tire innerliners. These same properties are also of importance in air cushions, pneumatic springs, air bellows, accumulator bags, and pharmaceutical closures. The thermal stability of the polymers of the disclosure make them ideal for rubber tire-curing bladders, high temperature service hoses, and conveyor belts for hot material handling.

The polymers exhibit high damping and have uniquely broad damping and shock absorption ranges in both temperature and frequency. They are useful in molded rubber parts and find wide applications in automobile suspension bumpers, auto exhaust hangers, and body mounts.

The polymers of the instant disclosure are also useful in tire sidewalls and tread compounds. In sidewalls, the polymer characteristics impart good ozone resistance, crack cut growth, and appearance. The polymers of the disclosure may also be blended. Properly formulated blends with high diene rubbers that exhibit phase co-continuity yield excellent sidewalls. Improvements in wet, snow, and ice skid resistances and in dry traction without compromises in abrasion resistance and rolling resistance for high performance tires can be accomplished by using the polymers of the instant disclosure.

Blends of the polymers of the disclosure with thermoplastic resins are used for toughening of these compounds. High-density polyethylene and isotactic polypropylene are often modified with 5 to 30 wt % of polyisobutylene. In certain applications, the instant polymers provide for a highly elastic compound that is processable in thermoplastic molding equipment. The polymers of the instant disclosure may also be blended with polyamides to produce other industrial applications.

The polymers of the instant disclosure may also be used as adhesives, caulks, sealants, and glazing compounds. They are also useful as plasticizers in rubber formulations with butyl, SBR, and natural rubber. In linear low density polyethylene (LLDPE) blends, they induce cling to stretch-wrap films. They are also widely employed in lubricants as dispersants and in potting and electrical cable filling materials.

In certain applications, the polymers of the disclosure make them also useful in chewing-gum, as well as in medical applications such as pharmaceutical stoppers, and the arts for paint rollers.

The following examples reflect embodiments of the disclosure and are by no means intended to be limiting of the scope of the disclosure.

EXAMPLES

Polymerizations were conducted in a laboratory-scale continuous reactor constructed of stainless steel and designed to permit the introduction of monomer and catalyst feeds as well as the continuous removal of the polymer product. Mixing was provided by a three-bladed impeller mounted on a stainless steel shaft and driven by an external electric motor. The motor was run at 1200 to 1600 rpm. The reactor was also equipped with a thermocouple to monitor the temperature of the reactor contents. The reactor was cooled to the desired reaction temperature by immersing the assembled reactor into a pentane or isohexane bath in an inert atmosphere glove box. The temperature of the stirred hydrocarbon bath was controlled to ±2° C. All apparatus in liquid contact with the reaction medium were dried at 120° C. and cooled in a nitrogen atmosphere before use.

Isobutylene (Matheson or ExxonMobil) and methyl chloride (Air Gas) were dried by passing the gas through three stainless steel columns containing barium oxide and were condensed and collected as liquids in the glove box. Alternatively, methyl chloride was dried by the addition of triethylaluminum to the liquid at low temperature and subsequently distilling the methyl chloride from this solution under its own vapor pressure. 1,1,1,2-Tetrafluoroethane (134a) (National Refrigerants) was dried by passing the gas through three stainless steel columns containing 3 Å molecular sieves and was condensed and collected as a liquid in the glove box. Isoprene (Aldrich) was either distilled prior to use or used as received. Isoprene was charged to the monomer feed at 2.8 mol % with respect to isobutylene. HCl solutions were prepared in either methyl chloride or 134a by dissolving gaseous HCl (Aldrich, 99% pure) into the condensed liquid at low temperature. The concentration of the HCl in these prepared solutions was determined by standard titration techniques. In the examples below, the diluent composition referred to as the "blend" is a 50/50 wt/wt mixture of 134a and methyl chloride.

The slurry copolymerizations were performed by first preparing the monomer and catalyst feeds. The monomer feed was prepared in a glass or metal reservoir and comprised isobutylene, isoprene, the selected diluent and any alcohol or other oxygenate. A catalyst feed was prepared for each copolymerization in a separate reservoir. The catalyst feed was prepared by adding a predetermined amount of the stock HCl solution, a hydrocarbon solution of ethylaluminum dichloride (EADC) and optionally an organic oxygenate. The EADC/HCl molar ratio in the catalyst feed for all examples was 3.0.

An initial monomer feed was also prepared and charged into the reactor for the purpose of starting the polymerization run. The concentration of monomer in this initial charge was 10 wt. % isobutylene. Isoprene was also charged to this initial monomer feed at 2.8 mol % relative to isobutylene. All feeds were chilled to the same temperature as the reactor using the chilled hydrocarbon bath of the glove box. Polymerizations in methyl chloride were conducted at a reactor temperature of about −95° C.±3° C. Polymerizations in 134a or the blend were conducted at a reactor temperature of about −75° C.±3° C. Near the beginning of the polymerization, the temperature of the bath was lowered a few degrees to provide an initial difference in temperature between the bath and the reactor contents. The copolymerizations were begun by introducing the catalyst. The catalyst flow rate was controlled to provide for a constant differential temperature between the reactor and the bath to achieve the target polymerization temperature for the run. Optionally, the temperature of the bath was lowered to aid in achieving the polymerization temperature target. Addition of monomer feed from the reservoir was introduced into the reactor approximately 10 minutes after the reaction commenced evidenced by the formation of precipitated polymer particles (slurry particles). The run was continued until the monomer feed in the reservoir was exhausted or until the desired amount of monomer feed was consumed. Generally, the average monomer conversion in these runs was better than 75% and at times as high as 95%.

At the end of the run, the contents of the reactor were emptied and the polymer film on the wall of the vessel below the vapor-liquid interface was collected, dried and weighed. The total amount of polymer produced during the run was also collected dried and weighed. A film ratio was then calculated for each run by dividing the mass (in milligrams, mg) of the wall film by the mass (in grams, g) of the total amount of polymer produced in the experiment. The film ratios presented below have the units of mg of film per g of polymer produced. The data for each example represent the average of at least 3 polymerizations conducted with the corresponding diluent and organic oxygenates at the specified concentrations. The data for average monomer feed rate and average wall film ratio were calculated as a simple average for the total number of runs conducted at that condition.

Figure 2:
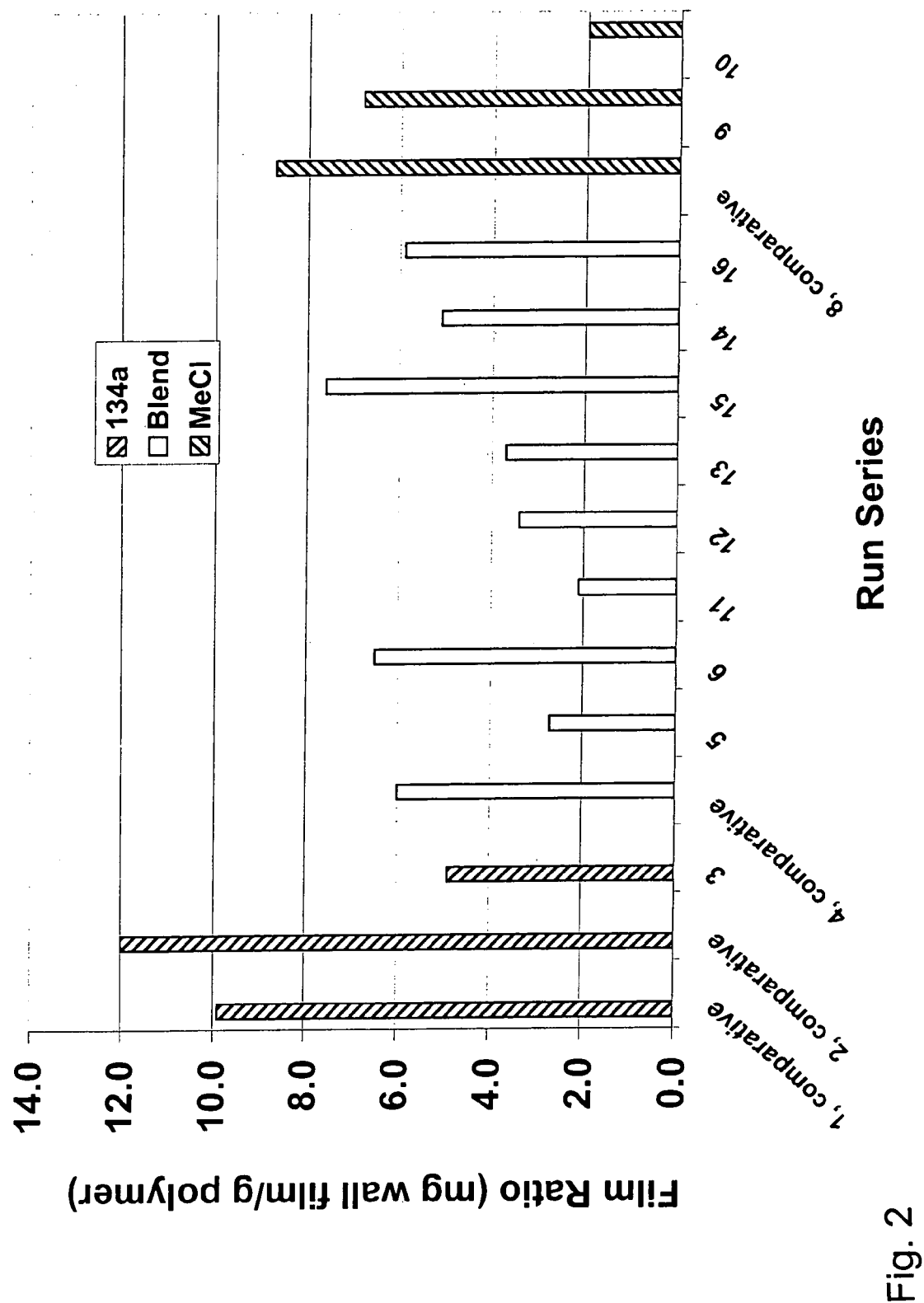
FIG. 2 is a bar graph comparing the film deposition rate for different polymerization systems with and without added oxygenates.

Terms used in Tables 1 and 2 and FIG. 2 are defined as follows: MeOH=methanol; DME=dimethyl ether; $Et_2O$ diethyl ether; DIPE=diisopropyl ether; MEK=methyl ethyl ketone; 134a=1,1,1,2-tetrafluoroethane; MeCl=methyl chloride; Blend=50/50 wt/wt mixture of 134a and MeCl; IB=isobutylene.

Run Series 1-10

Run Series 1-10 show the effect of an alcohol additive in the monomer feed where there are no oxygenates present in the catalyst feed. Run Series 1, 2, 4 and 8 did not contain added organic oxygenates and are comparative examples. Run Series 3, 5-7 and 9-10 represent embodiments of the present disclosure and demonstrate that the addition of organic oxygenates to the feeds results in a decrease in the wall film ratio, as reported in Table 1 and shown in FIG. 2.

The content of isobutylene used in the monomer feed for Run Series 1 to 10 is provided in Table 1. The concentration of any added alcohol is provided in Table 1. For the polymerizations in Run Series 4, 5 and 7, the methyl chloride was dried by passing the gas through a desiccant bed as described above. The desiccant was not completely effective at removing traces of methanol, dimethyl ether and acetone that were adventitiously present in the methyl chloride. The concentrations of these components in the methyl chloride were determined by gas chromatography (GC). The values determined by GC for these organic oxygenates were used to calculate the total concentration of these components in the final feed blend. The total oxygenate concentration is listed in Table 1. The methyl chloride used for Run Series 6, 8, 9 and 10 was collected by distillation from liquid methyl chloride treated with triethylaluminum. This procedure removes adventitious methanol, dimethyl ether and acetone. Therefore, the methyl chloride used for these runs did not contain any of these organic oxygenates unless they were purposely added, as indicated in Table 1. HFC 134a does not contain these organic oxygenates.

TABLE 1

Oxygenate Added to Monomer Feed

| Run Series | Diluent | Wt % 1B Monomer Feed | Monomer Feed Rate (ml/min) | Oxygenate Concentration in Reactor (wppm) | | | | Film Ratio (mg film/g polymer) |
|---|---|---|---|---|---|---|---|---|
| | | | | MeOH | EtOH | DME | Acetone | |
| 1 | 134a | 20 | 11.3 | 0 | 0 | 0 | 0 | 9.9 |
| 2 | 134a | 22 | 18.9 | 0 | 0 | 0 | 0 | 12.0 |
| 3 | 134a | 20 | 11.6 | 5.0 | 0 | 0 | 0 | 4.9 |
| 4 | Blend | 20 | 11.4 | 0.2 | 0 | 1.2 | 0.2 | 6.0 |
| 5 | Blend | 20 | 11.9 | 5.7 | 0 | 1.2 | 0.2 | 2.7 |
| 6 | Blend | 22 | 19.1 | 5.0 | 0 | 6.0 | 1.0 | 6.5 |
| 7 | Blend | 20 | 9.6 | 0.2 | 7.0 | 1.2 | 0.2 | 3.5 |
| 8 | MeCl | 22 | 15.0 | 0 | 0 | 0 | 0 | 8.7 |
| 9 | MeCl | 22 | 16.1 | 5.0 | 0 | 0 | 0 | 6.8 |
| 10 | MeCl | 22 | 16.8 | 5.0 | 0 | 6.0 | 1.0 | 2.0 |

Run Series 11-16

Run Series 11-16 listed in Table 2 show the effect of an alcohol additive in the monomer feed when there are oxygenates added in the catalyst feed. For these runs, the monomer feed contained 20 wt % isobutylene and isoprene at 2.8 mol % with respect to isobutylene, and the average monomer feed rate is listed in Table 2. Table 2 also identifies the oxygenate that was purposely added to the catalyst feed, and the amount of that oxygenate as a mol % of the EADC in that catalyst feed. The methyl chloride used for these polymerizations was dried by passing the gas through a desiccant bed as described above, which was not completely effective at removing traces of methanol, dimethyl ether and acetone that are adventitiously present in the methyl chloride. The values determined by GC for these organic oxygenates were used to calculate the total concentration of these components in the final feed blend. The concentration of the alcohol and other oxygenates listed in Table 2 is the steady state concentration in the reactor that results from their addition to the reactor.

not inconsistent with this disclosure and for all jurisdictions in which such incorporation is permitted. When numerical lower limits and numerical upper limits are listed herein, ranges from any lower limit to any upper limit are contemplated.

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A method to decrease polymer deposition on reactor surfaces in a slurry polymerization system, comprising:

TABLE 2

Oxygenate Added to Monomer and Catalyst Feeds (Diluent Blend)

| Run Series | Monomer Feed Rate (ml/min) | Oxygenate Added to Catalyst Feed | | Oxygenate Concentration in Reactor (wppm) | | | | | | Film Ratio (mg film/g polymer) |
|---|---|---|---|---|---|---|---|---|---|---|
| | | Type | Mol % Rel. to EADC | MeOH | DME | Acetone | Et$_2$O | DIPE | MEK | |
| 11 | 10.3 | Et$_2$O | 5 | 5.7 | 1.2 | 0.2 | 3.1 | 0 | 0 | 2.1 |
| 12 | 9.9 | Et$_2$O | 10 | 5.7 | 1.2 | 0.2 | 8.1 | 0 | 0 | 3.4 |
| 13 | 10.3 | Acetone | 5 | 5.7 | 1.2 | 3.2 | 0 | 0 | 0 | 3.7 |
| 14 | 9.2 | Acetone | 10 | 5.7 | 1.2 | 7.0 | 0 | 0 | 0 | 5.1 |
| 15 | 10.3 | DIPE | 10 | 5.7 | 1.2 | 0.2 | 0 | 10.3 | 0 | 7.6 |
| 16 | 9.7 | MEK | 10 | 5.7 | 1.2 | 0.2 | 0 | 0 | 9.8 | 5.9 |

Run Series 17-19

Run Series 3, 5 and 15 above are repeated except that the methanol is added at the same rate to the catalyst feed, instead of the monomer feed. There is essentially no effect on the film ratio when the methanol is not added via the monomer feed.

All patents and patent applications, test procedures (such as ASTM methods), and other documents cited herein are fully incorporated by reference to the extent such disclosure is supplying a monomer feed and a catalyst feed to form a polymerization medium in the reactor;
concurrently supplying an alcohol to the polymerization medium in a feed separate from the catalyst feed.

2. The method of claim 1, wherein the alcohol has from 1 to 4 carbon atoms.

3. The method of claim 1, wherein the alcohol comprises methanol.

4. The method of claim 1, wherein the catalyst feed is free of added alcohol.

5. The method of claim 1 wherein the alcohol comprises at least 2 wppm by weight of the monomer feed before being polymerized.

6. The method of claim 1 wherein the alcohol comprises an amount effective to reduce film deposition up to 30 wppm by total weight of the monomer feed.

7. The method of claim 1 further comprising adding the alcohol to the monomer feed.

8. The method of claim 1 further comprising adding the alcohol to the reaction medium in a separate feed without monomer or catalyst.

9. The method of claim 1 further comprising supplying one or more oxygenate(s), selected from ethers and ketones having from 1 to 12 carbon atoms, to the polymerization medium.

10. The method of claim 9, wherein said one or more oxygenates has an amount up to 10 wppm by total weight of the polymerization medium.

11. The method of claim 9, wherein the one or more oxygenate(s) is effective to further decrease polymer deposition.

12. The method of claim 9, wherein the one or more oxygenate(s) comprises less than 5 wppm by total weight of the polymerization medium.

13. The method of claim 9, wherein the one or more oxygenate(s) is supplied with the catalyst feed.

14. The method of claim 1, wherein the catalyst feed comprises one or more Lewis acid(s) and one or more initiator(s).

15. The method of claim 14, wherein the one or more initiator(s) is independently selected from the group consisting of water, a hydrogen halide, a carboxylic acid, a carboxylic acid halide, a sulfonic acid, an alcohol, a phenol, a polymeric halide, a tertiary alkyl halide, a tertiary aralkyl halide, a tertiary alkyl ester, a tertiary aralkyl ester, a tertiary alkyl ether, a tertiary aralkyl ether, an alkyl halide, an aryl halide, an alkylaryl halide or an arylalkylacid halide.

16. The method of claim 14, wherein the catalyst is free of alcohol.

17. The method of claim 14, wherein the catalyst further comprises a weakly-coordinating anion.

18. The method of claim 1, wherein the monomer feed comprises one or more monomer(s) and a diluent.

19. The method of claim 18, wherein the one or more monomer(s) is independently selected from the group consisting of olefins, alpha-olefins, disubstituted olefins, isoolefins, conjugated dienes, non-conjugated dienes, styrenics, substituted styrenics, and vinyl ethers.

20. The method of claim 18, wherein the one or more monomer(s) is independently selected from the group consisting of styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, 13-pinene, myrcene, 6,6-dimethyl-fulvene, hexadiene, cyclopentadiene, methyl cyclopentadiene, piperylene, methyl vinyl ether, ethyl vinyl ether, and isobutyl vinyl ether.

21. The method of claim 18, wherein the diluent comprises halogenated hydrocarbon.

22. The method of claim 18, wherein the diluent comprises one or more chlorinated hydrocarbon(s).

23. The method of claim 18, wherein the diluent comprises methyl chloride.

24. The method of claim 18, wherein the diluent comprises one or more hydrofluorocarbon(s) (HFC's).

25. The method of claim 24, wherein the one or more hydrofluorocarbon(s) is represented by the formula: $C_xH_yF_z$ wherein x is an integer from 1 to 40 and y and z are integers of one or more.

26. The method of claim 18, wherein the diluent is independently selected from the group consisting of fluoromethane, difluoromethane, trifluoromethane, 1,1-difluoroethane, 1,1,1-trifluoroethane, 1,1,1,2-tetrafluoroethane, and mixtures thereof.

27. The method of claim 1, wherein the reactor is independently selected from the group consisting of a continuous flow stirred tank reactor, a plug flow reactor, a moving belt or drum reactor, a jet or nozzle reactor, a tubular reactor, a batch reactor, and an autorefrigerated boiling-pool reactor.

28. The method of claim 1, wherein film forms in the reactor at a ratio of 10 mg film or less per g of polymer formed.

29. The method of claim 1, wherein film forms in the reactor at a ratio of 3 mg film or less per g of polymer formed.

30. The method of claim 1, further comprising:
recovering a polymer slurry from the reactor;
separating an alcohol-lean diluent from the polymer slurry;
recycling the separated diluent to the monomer feed; and
adding the alcohol to the monomer feed.

31. The method of claim 30, further comprising:
monitoring alcohol content in the monomer feed; and
adjusting a rate of the alcohol addition to the monomer feed to control the monitored alcohol content in the monomer feed at a desired level.

32. A slurry polymerization system, comprising:
a reactor adapted to polymerize a polymerization medium comprising a halogenated hydrocarbon diluent, one or more monomer(s) and a catalyst comprising one or more Lewis acid(s) and one or more initiator(s);
a line adapted to supply catalyst to the reactor;
a line adapted to supply monomer to the reactor separately from the catalyst line; and
a line adapted to add alcohol to the reactor separately from the catalyst line, the alcohol addition line feeding into the monomer supply line.

33. The slurry polymerization system of claim 32, wherein the reactor comprises a butyl reactor.

34. The slurry polymerization system of claim 32, further comprising:
means for determining a total alcohol supply rate to the reactor; and
means for adjusting a rate of alcohol addition to obtain a total alcohol supply rate at a desired level.

35. The slurry polymerization system of claim 34, wherein the means for determining a total alcohol supply rate to the reactor comprises at least one an on-line analyzer or a flowmeter.

36. The slurry polymerization system of claim 35, further comprising a diluent recovery loop to recover diluent from an effluent from the reactor, purify the diluent and recycle alcohol-lean diluent to the monomer supply line.

37. The slurry polymerization system of claim 36, wherein the diluent recovery loop comprises a fractionation unit.

38. The slurry polymerization system of claim 34, wherein the means for adjusting a rate of alcohol addition to obtain a total alcohol supply rate at a desired level comprises at least one of a valve or a flow controller.

* * * * *